(12) United States Patent
Ryou et al.

(10) Patent No.: US 10,892,531 B2
(45) Date of Patent: Jan. 12, 2021

(54) ZINC-AIR SECONDARY BATTERY

(71) Applicant: E.M.W. ENERGY CO., LTD., Seoul (KR)

(72) Inventors: Byoung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 162 days.

(21) Appl. No.: 16/077,583

(22) PCT Filed: Feb. 8, 2017

(86) PCT No.: PCT/KR2017/001359
§ 371 (c)(1),
(2) Date: Aug. 13, 2018

(87) PCT Pub. No.: WO2017/138737
PCT Pub. Date: Aug. 17, 2017

(65) Prior Publication Data
US 2019/0036188 A1    Jan. 31, 2019

(30) Foreign Application Priority Data
Feb. 12, 2016   (KR) .................. 10-2016-0016343

(51) Int. Cl.
*H01M 12/08*    (2006.01)
*H01M 4/134*   (2010.01)
*H01M 4/74*    (2006.01)

(52) U.S. Cl.
CPC ........... *H01M 12/08* (2013.01); *H01M 4/134* (2013.01); *H01M 4/74* (2013.01); *Y02E 60/10* (2013.01)

(58) Field of Classification Search
CPC ......... H01M 12/08; H01M 4/134; H01M 4/74
See application file for complete search history.

(56) References Cited

U.S. PATENT DOCUMENTS

| | | | | |
|---|---|---|---|---|
| 2014/0017577 A1* | 1/2014 | Minami | .............. | H01M 4/9016 429/405 |
| 2014/0227616 A1* | 8/2014 | Yamada | ................ | H01M 12/08 429/406 |

FOREIGN PATENT DOCUMENTS

| | | |
|---|---|---|
| CN | 103947036 A | 7/2014 |
| JP | H05144482 A | 6/1993 |
| JP | 2009-140898 A | 6/2009 |
| KR | 10-2006-0086123 A | 7/2006 |
| KR | 10-2009-0010365 A | 1/2009 |
| KR | 10-2012-0032270 A | 4/2012 |
| KR | 10-2012-0070729 A | 7/2012 |

(Continued)

OTHER PUBLICATIONS

Lee et al., EPO machine translation for KR 10-2012-0070729 A; 2012 (Year: 2012).*

(Continued)

*Primary Examiner* — Adam A Arciero
(74) *Attorney, Agent, or Firm* — The PL Law Group, PLLC

(57) ABSTRACT

A zinc-air secondary battery includes an air positive electrode part, a separator, and a zinc gel negative electrode part. The zinc gel negative electrode part includes therein at least one middle layer made of mesh or foam. In a zinc-air secondary battery, oxygen discharging efficiency that is present in a zinc gel negative electrode part is high, and thus charging performance of the zinc-air secondary battery can be improved.

3 Claims, 3 Drawing Sheets

(56) References Cited

FOREIGN PATENT DOCUMENTS

| | | |
|---|---|---|
| KR | 10-2012-0100300 A | 9/2012 |
| KR | 10-2014-0041050 A | 4/2014 |
| KR | 10-2019-0060619 A | 6/2019 |

OTHER PUBLICATIONS

International Search Report for PCT/KR2017/001359 dated May 29, 2017.
Notice of Allowance dated Aug. 9, 2017 from Korean Patent Office in a counterpart Korean Patent Application No. 10-2016-0016343 (all the cited references are listed in this IDS.) (English translation is also submitted herewith.).

* cited by examiner

ZINC-AIR SECONDARY BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/001359, filed Feb. 8, 2017, which claims priority to the benefit of Korean Patent Application No. 10-2016-0016343 filed in the Korean Intellectual Property Office on Feb. 12, 2016, the entire contents of which are incorporated herein by reference.

TECHNICAL FIELD

The present invention relates to a zinc-air secondary battery having high oxygen-discharging efficiency.

BACKGROUND

An electrochemical power source is a device in which electric energy can be generated by an electrochemical reaction, and to which a zinc-air secondary battery also corresponds. The zinc-air secondary battery employs a zinc gel negative electrode part made of a zinc gel to be converted into a zinc oxide during discharging and an air positive electrode part having a shape of a layer that is a permeable layer including water molecules and in contact with oxygen present in the air to generate hydroxyl ions.

Such a zinc-air secondary battery has many advantages compared to a hydrogen fuel battery according to the related art. In particular, because a rich fuel such as zinc (Zn) is present as metal or an oxide thereof, the supply of energy supplied from the zinc-air secondary battery is not visibly depleted. Also, hydrogen fuel batteries according to the related art are required to be re-filled, whereas the zinc-air secondary battery can be electrically re-charged and used, and can transmit a higher output voltage of 1.4V than general fuel batteries having a voltage of less than 0.8V.

Accordingly, in the zinc-air secondary battery that is chargeable/dischargeable, as discharging is carried out, Zn of the zinc gel negative electrode part gradually becomes the zinc oxide, and during charging, oxygen present in the zinc oxide is separated and discharged, and returns to original zinc. That is, when discharging is sufficiently performed, the higher the oxygen-discharging efficiency of the zinc gel negative electrode part, the higher the charging performance of the zinc-air secondary battery.

However, in a zinc-air secondary battery according to the related art, oxygen present in the zinc gel negative electrode part is not smoothly discharged during charging, and in order to improve the charging performance of the zinc-air secondary battery, it is significant to improve discharging efficiency of oxygen that is present in the zinc gel negative electrode part.

SUMMARY

The present invention is directed to providing a zinc-air secondary battery that is capable of effectively discharging oxygen present in a zinc gel negative electrode part.

One aspect of the present invention provides a zinc-air secondary battery, and more particularly, a zinc-air secondary battery including an air positive electrode part, a separator, and a zinc gel negative electrode part, wherein the zinc gel negative electrode part includes therein at least one middle layer made of mesh or foam.

In a zinc-air secondary battery according to the present invention, oxygen discharging efficiency that is present in a zinc gel negative electrode part is high, and thus charging performance of the zinc-air secondary battery according to the present invention can be improved compared to a zinc-air secondary battery according to the related art.

DETAILED DESCRIPTION

Figure 1:
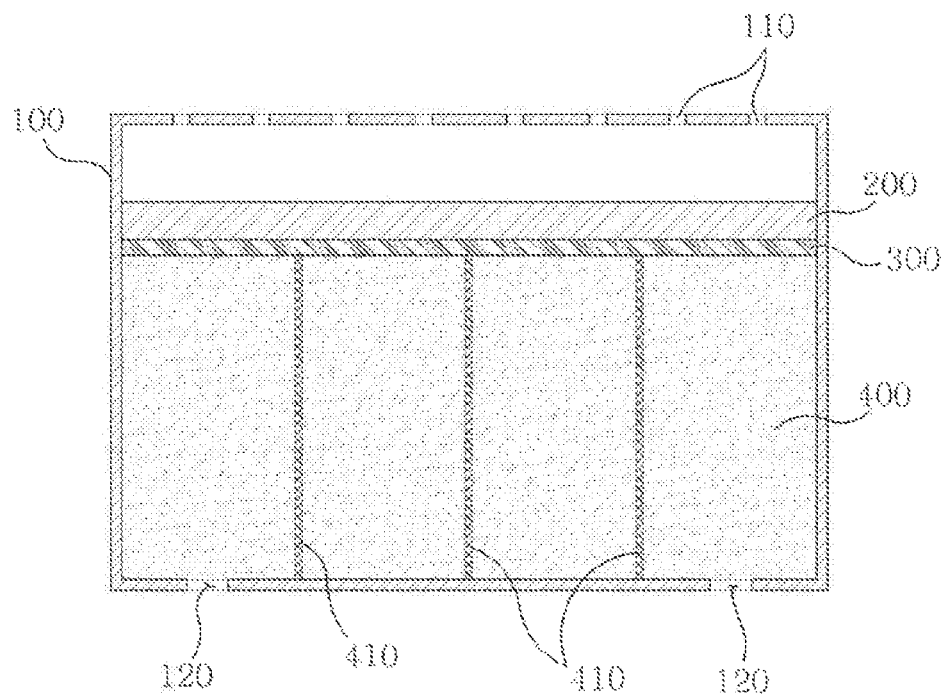
FIG. 1 is a lateral cross-sectional view for illustrating a structure of a zinc-air secondary battery according to the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof but do not preclude the presence or addition of one or more other features, integers, steps, operations, elements, components, and/or groups thereof.

While such terms as "first," "second," etc., may be used to describe various components, such components must not be limited to the above terms. The above terms are used only to distinguish one component from another.

The present invention relates to a zinc-air secondary battery, and more particularly, to a zinc-air secondary batter including an air positive electrode part, a separator, and a zinc gel negative electrode part, wherein the zinc gel negative electrode part includes therein at least one middle layer made of mesh or foam.

In the present invention, the air positive electrode part includes an air diffusion layer, a catalyst active layer, and a positive electrode collector layer, as generally known, and preferably, the air diffusion layer may be formed of a hydrophobic layer material, such as polytetrafluoroethylene (PTFE), so as to extend a life-span of the zinc-air secondary battery by preventing moisture and carbon dioxide ($CO_2$) in the external air from permeating into the zinc-air secondary battery, and the catalyst active layer is formed of a carbon material that causes a reaction of the following Formula 1 by reacting with permeated oxygen, and preferably, the positive electrode collector layer that collects electrons generated by the chemical reaction of the catalyst active layer may have a mesh structure formed of a conductive material, such as metal.

$$O_2+2H_2O+4e^- \leftrightarrow 4OH^-$$ [Formula 1]

In the present invention, because the separator that is interposed between the air positive electrode part and the zinc gel negative electrode part, so as to prevent a short circuit between the air positive electrode part and the zinc gel negative electrode part, is required to transmit hydroxyl ions generated by a chemical reaction with oxygen present in the catalyst active layer of the air positive electrode part to the zinc gel negative electrode part, preferably, the separator may be formed of a material having ion permeability, such as polypropylene.

In the present invention, the zinc gel negative electrode part that includes a zinc gel having a shape of a gel in which zinc (Zn) and an electrolyte are mixed with each other, causes a reaction of the following Formula 2 and functions as a negative electrode.

$$Zn+2OH^- \leftrightarrow Zn(OH)_2+2e^-$$

$$Zn+OH^{-H} \leftrightarrow ZnO+H_2O+2e^-$$ [Formula 2]

Through the reaction of the above Formula 2, water molecules are generated in the zinc gel negative electrode part, and the water molecules generated through the reaction are moved to the air positive electrode part and are used in the chemical reaction of the above Formula 1.

The zinc-air secondary battery according to the present invention includes therein at least one middle layer made of mesh or foam and may promote discharging of oxygen that is present in the zinc gel negative electrode part due to the structural characteristics. Thus, oxygen-discharging efficiency can be improved compared to the zinc-air secondary battery according to the related art, which is directly connected to improvements in the charging performance of the zinc-air secondary battery.

In the present invention, the material of the middle layer is not specifically limited but may be preferably Zn so that discharging of oxygen present in the zinc gel negative electrode part can be promoted and degradation of charging/discharging performance of the zinc-air secondary battery can be minimized.

In addition, the middle layer may be arranged in a certain position or direction within the zinc gel negative electrode part, and the number of middle layers may be one, two, or more. However, preferably, the middle layer may be formed in a direction perpendicular to faces of the separator so that oxygen that remains in the zinc gel negative electrode part can be effectively discharged through the separator, and furthermore, more preferably, the middle layer formed perpendicularly to the faces of the separator may be positioned in a grid pattern arrangement so that oxygen present in the zinc gel over the whole of the zinc gel negative electrode part can be evenly discharged.

Meanwhile, when the zinc-air secondary battery according to the present invention has a cylindrical shape, a spiral wound type of the middle layer may be preferably formed in the cylindrical zinc gel negative electrode part in terms of oxygen-discharging efficiency.

The zinc-air secondary battery according to the present invention has high discharging efficiency of oxygen that is present in the zinc gel negative electrode part, and thus the charging performance thereof is high compared to the zinc-air secondary battery according to the related art.

Hereinafter, for understanding of the present invention, an example illustrated in the drawings will be described. However, the example illustrated in the following drawings is just an example for explaining the present invention, and the scope of the invention is not limited thereby.

FIG. 1 is a lateral cross-sectional view for illustrating a structure of a zinc-air secondary battery according to the present invention. Referring to FIG. 1, the zinc-air secondary battery according to an example of the present invention includes an air positive electrode part 200 and a zinc gel negative electrode part 400 within a case 100, and a separator 300 is interposed between the air positive electrode part 200 and the zinc gel negative electrode part 400.

A plurality of air holes 110 are formed in an upper portion of the case 100 so that the external air can be introduced into the zinc-air secondary battery through the plurality of air holes 110, and a terminal exposure part 120 is formed at a lower portion of the case 100. A middle layer 410 formed of mesh is formed in the zinc gel negative electrode part 400 to be perpendicular to faces of the separator 300 so that oxygen present in the zinc gel negative electrode part 400 can be smoothly discharged through the middle layer 410 formed of mesh, and the discharged oxygen gas is discharged to the outside via the separator 300 and the air positive electrode part 200.

Figure 2:
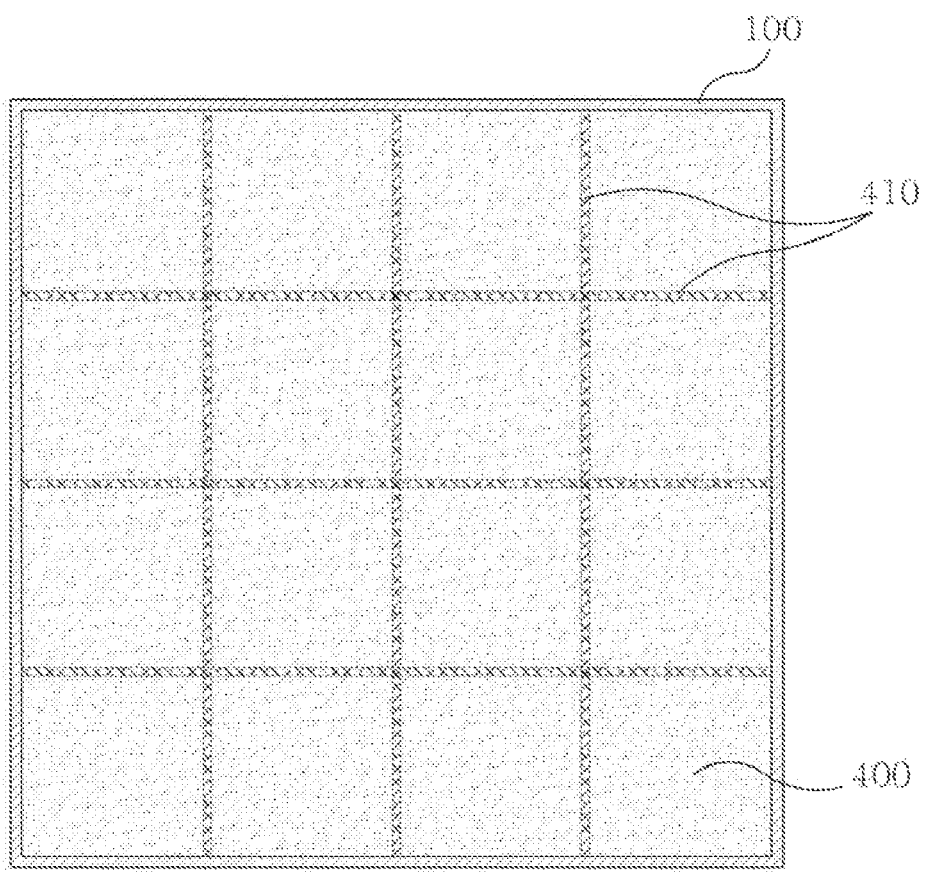
FIG. 2 is a cross-sectional view of a zinc gel negative electrode part for illustrating an example of an arrangement structure of a middle layer according to the present invention.

FIG. 2 is a cross-sectional view of a zinc gel negative electrode part for illustrating an example of an arrangement structure of a middle layer according to the present invention. Referring to FIG. 2, the middle layer 410 formed of mesh is formed in a grid pattern arrangement over the whole of the zinc gel negative electrode part 400 so that oxygen present in the zinc gel negative electrode part 400 can be evenly discharged.

Figure 3:
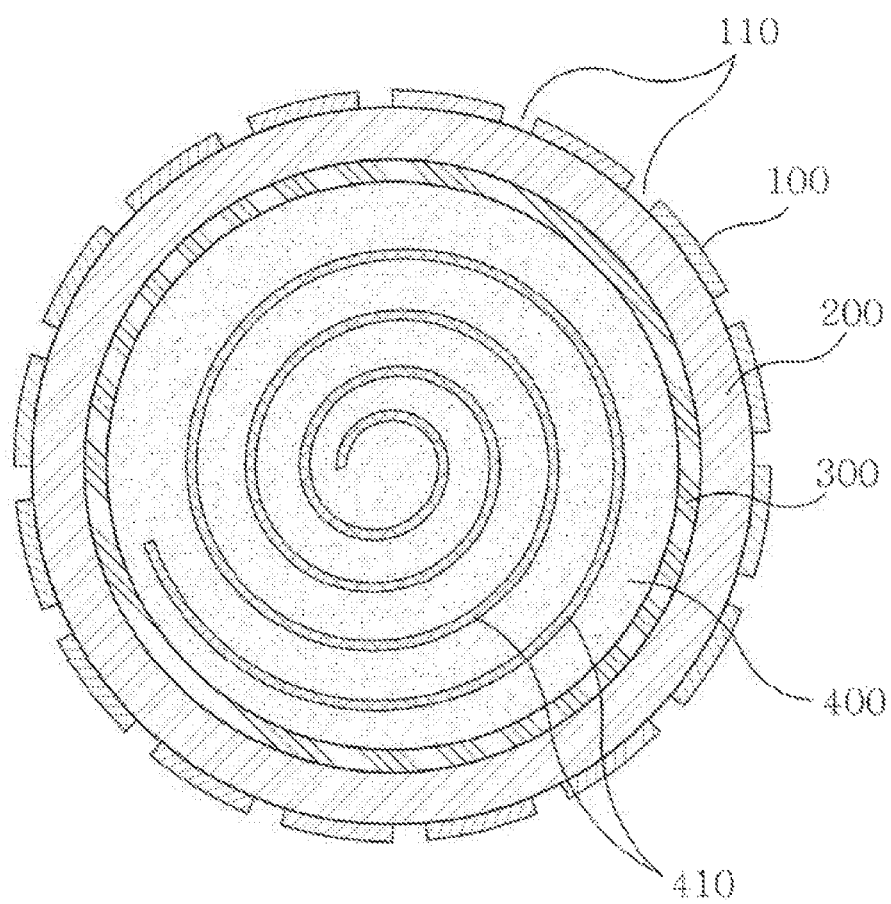
FIG. 3 is a cross-sectional view of a zinc gel negative electrode part for illustrating another example of an arrangement structure of a middle layer according to the present invention.

In addition, FIG. 3 is a cross-sectional view of a zinc gel negative electrode part for illustrating another example of an arrangement structure of a middle layer according to the present invention. When the zinc-air secondary battery according to the present invention has a cylindrical shape, a spiral wound type of middle layer 410 is formed in the cylindrical zinc gel negative electrode part 400 so that oxygen present in the cylindrical zinc gel negative electrode part 400 can be evenly and effectively discharged.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A zinc-air secondary battery comprising:
   an air positive electrode part;
   a zinc gel negative electrode part having at least one middle layer formed of mesh or foam; and
   a separator interposed between the air positive electrode part and the zinc gel negative electrode part,
   wherein the at least one middle layer is extended downwards from a surface of the separator, and the at least one middle layer is formed perpendicularly to the surface of the separator.

2. The zinc-air secondary battery of claim 1, wherein the middle layer is formed of zinc (Zn).

3. The zinc-air secondary battery of claim 1, wherein the middle layer is positioned in a grid pattern arrangement.

* * * * *